Feb. 13, 1940.   H. C. BOWEN   2,190,228
FLUID PRESSURE SYSTEM
Filed Sept. 7, 1937   2 Sheets-Sheet 1

INVENTOR.
HERBERT C. BOWEN
BY C. H. Fowler
ATTORNEY

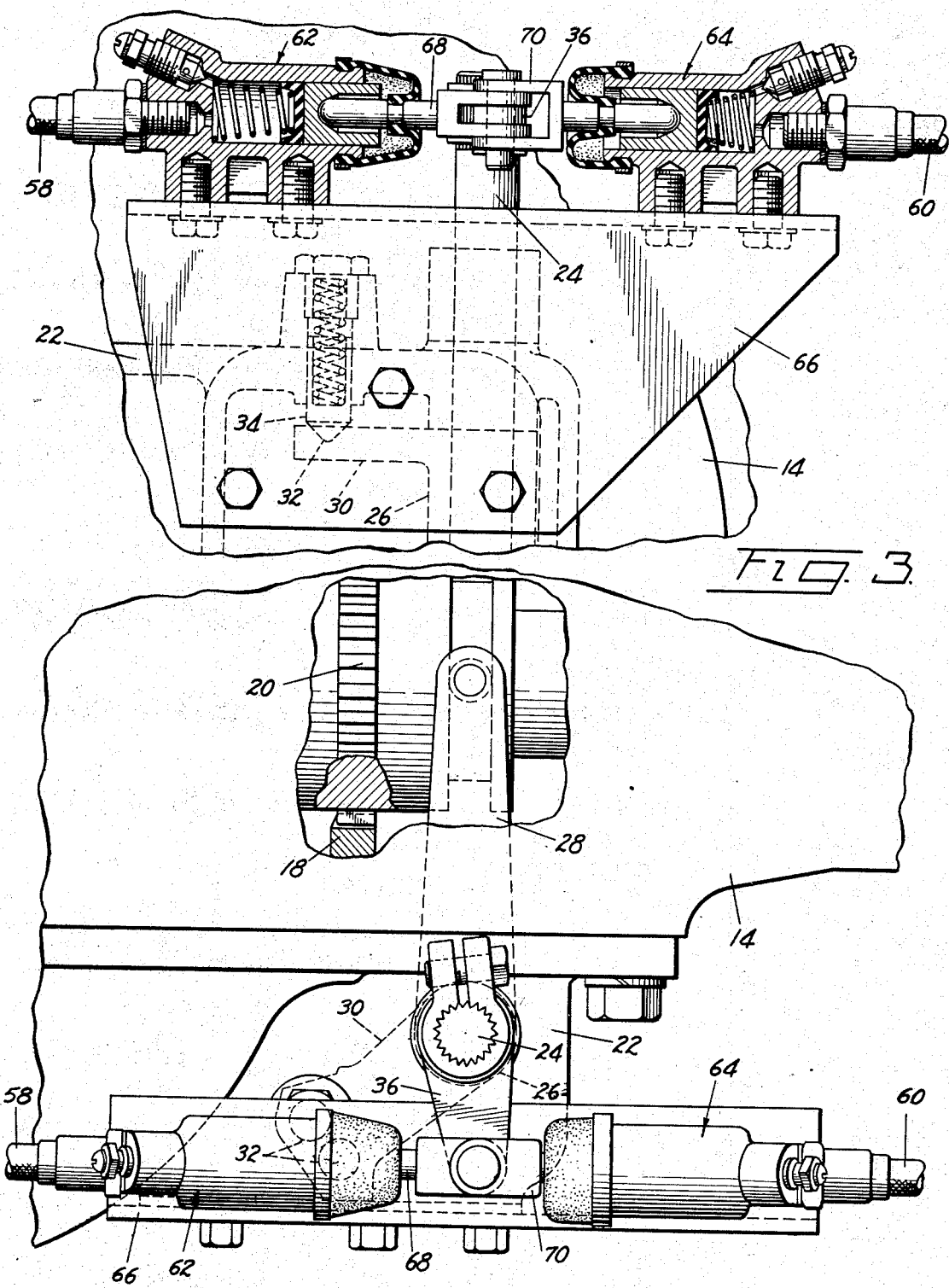

Patented Feb. 13, 1940

2,190,228

UNITED STATES PATENT OFFICE 2,190,228

FLUID PRESSURE SYSTEM

Herbert C. Bowen, Detroit, Mich., assignor to Hydraulic Brake Company, Detroit, Mich., a corporation of California Application September 7, 1937, Serial No. 162,787

6 Claims. (Cl. 60—54.6)

This invention relates to fluid pressure systems. Broadly the invention comprehends a simple and efficient fluid pressure system for actuating a planetary transmission. In a preferred embodiment of the invention, a duplex fluid pressure producing device has connected thereto opposed fluid pressure actuated motors and a lever for actuating the shiftable element of a planetary transmission is connected between the motors. The duplex fluid pressure producing device is operative to selectively energize the motors so that the lever may be moved to either of two positions so as to effectively shift the gears of the transmission.

An object of the invention is to provide a fluid pressure system having but few parts, arranged in compact form, and so connected to the shifting lever of a planetary transmission as to insure positive actuation of the transmission.

Another object of the invention is to provide a duplex fluid pressure producing device having connected thereto opposed fluid pressure actuated motors connected respectively to the shifting lever of a planetary transmission.

A further object of the invention is to provide an efficient duplex fluid pressure producing device of marked simplicity as a whole and in respect to each of its component parts so that its manufacture may be economically facilitated both as regards parts and their assembly.

Other objects and advantages of the invention will appear from the following description taken in connection with the drawings forming a part of the specification, and in which—

Fig. 3 is a fragmentary view of an actuator, and fluid pressure actuated motors for operating the actuator, the motors being shown in section; and Fig. 4 is a fragmentary view of a two-speed axle, the transmission thereof, and the fluid pressure actuated motors.

Figure 1:
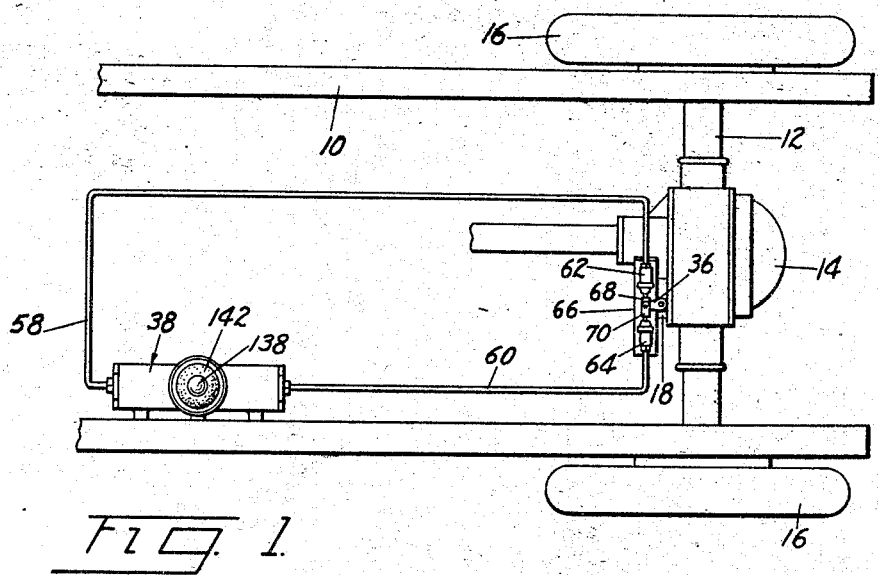
Fig. 1 is a top plan view of a motor vehicle chassis, partly broken away, illustrating the invention as applied.
Figure 2:
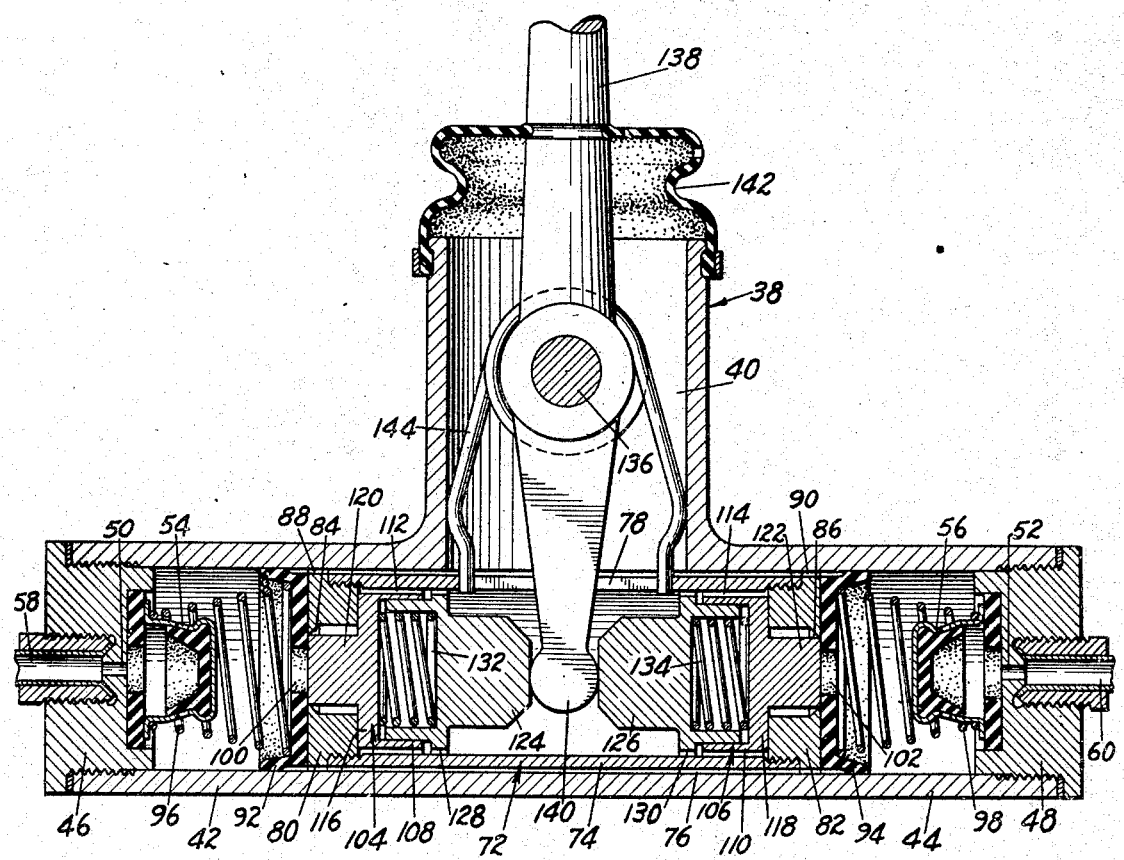
Fig. 2 is a vertical sectional view of the fluid pressure producing device.

Referring to the drawings for more specific details of the invention, 10 represents a motor vehicle chassis frame supported on springs, not shown, suspended from a front axle, also not shown, and a rear axle 12 having a differential 14. The axle 12 has mounted thereon for rotation wheels 16 of conventional type, and a two-speed transmission 18 including a shiftable gear 20 is associated with the differential.

A casing 22 suitably secured to the housing of the differential 14 has mounted therein a rotatable shaft 24, and a sleeve 26 keyed on the shaft has formed integral therewith a fork 28 embracing the shiftable gear 20 and a lever 30 having spaced recesses 32 arranged therein adjacent its free end for the reception of a spring-pressed plunger 34 for retaining the lever, and, accordingly, the fork 28 and gear 20, in either one of two positions. The shaft also has suitably secured thereto, outside of the casing, an operating lever 36.

A fluid pressure producing device indicated generally at 38 is suitably mounted on the frame 10. This device includes a reservoir 40 having at its base corresponding cylinders 42 and 44 arranged in axial alignment with respect to one another and diametrically of the reservoir with oppositely disposed ends opening directly into the reservoir. The outer ends of the cylinders 42 and 44 are closed as by heads 46 and 48 provided with discharge ports 50 and 52 controlled as by two-way valves 54 and 56.

The discharge ports 50 and 52 are connected by fluid pressure delivery pipes or conduits 58 and 60 to fluid pressure actuated motors 62 and 64 arranged for the actuation of the lever 36. As shown, a bracket 66 suitably secured on the casing 22 supports the motors in oppositely disposed relation to one another, and thrust pins 68 and 70 connect the pistons of the respective motors to the lever 36.

A double-headed piston 72 reciprocable in the cylinders 42 and 44 includes a hollow cylindrical body 74 having a diameter slightly less than that of the cylinders, providing, in conjunction with the walls of the respective cylinders, an annular passage 76 communicating with the reservoir; and arranged in the wall of the body portion is a slot 78, providing a communication between the reservoir and the interior of the body 74.

Corresponding heads 80 and 82 detachably secured to the respective ends of the body 74 have axial ports 84 and 86 providing communications between the interior of the body 74 and those portions of the cylinders 42 and 44 forward of the heads. The heads also have spaced peripheral slots 88 and 90 providing communications between those portions of the cylinders forward of the head and the annular passage 76.

Collapsible sealing cups 92 and 94 seated on the respective heads 80 and 82 of the piston control the passages 88 and 90, and springs 96 and 98 interposed between the respective cups and the two-way valves 54 and 56 serve to retain the cups and valves against displacement. The sealing cups 92 and 94 have axial openings 100 and 102, and the perimeters defining these openings overhang the ports 84 and 86 in the respective heads of the pistons, the object of which will hereinafter appear.

Corresponding plungers 104 and 106, mounted for reciprocation in the body of the piston, are arranged in oppositely disposed relation to one another. As shown, the plungers include shells 108 and 110 having peripheral slots 112 and 114 providing passages through the shells. The plungers have heads 116 and 118 adapted to engage the backs of the heads of the respective pistons when the plungers are in advanced position, and arranged concentrically on the heads 116 and 118 are projections 120 and 122 adapted to enter the ports 84 and 86 and engage the sealing cups 92 and 94 so as to effectively seal the ports.

Corresponding pressure blocks 124 and 126 reciprocable in the shells 108 and 110 have passages 128 and 130 in their perimeters providing communications between the passages 112 and 114 and the interior of the piston. The blocks also have recesses for the reception of springs 132 and 134 interposed between the blocks and the plungers.

A shaft 136 arranged transversely of the reservoir 40 has mounted thereon, within the reservoir, an operating lever 138. The lower end 140 of this lever is interposed between the pressure blocks 124 and 126, and a flexible cup 142 sleeved on the lever embraces the open end of the reservoir so as to exclude dust and other foreign substances from the reservoir. A spring 144 wound on the shaft has its respective ends engaging the wall of the reservoir and projecting into the slot 78 in the body of the piston. This spring serves to return the piston to its position of rest and to center the piston.

In a normal operation, upon actuating the operating lever 138, force is transmitted therefrom to the piston 72, resulting in movement of the piston in either one of two directions. Assuming that the operating lever 138 is moved backwardly, under this condition, the piston 72 is moved forwardly against the resistance of the spring 144. During the initial movement of the piston, the force applied thereto is received by the pressure block 124 of the expansible plunger 104, resulting in compression of the spring 132, and thereafter the plunger 104 moves as a single unit.

The plunger bears against the back of the head 80 of the piston and the projection 120 on the plunger rests in the port 84 in the head 80 of the piston, in engagement with the inner perimeter of the cup 92. Accordingly, upon further movement of the piston, fluid is displaced from the cylinder 42 past the valve 54 through the discharge port 50 and the fluid pressure delivery pipe 58 into the fluid pressure actuated motor 62, causing energization of the motor. This results in rocking the shaft 24 and the fork 28 carried by the shaft, and this movement of the fork moves the gear 20 to shift the transmission to the low speed position.

During this operation the head 82 of the piston recedes, and a partial vacuum is created in that portion of the cylinder 44 forward of the head 82. This results in drawing fluid from the reservoir, through the annular passage 76, the passages 90 in the head 82, and past the cup 94 on the head, into that portion of the cylinder 44 forward of the head, completely filling the cylinder.

Now, upon releasing the lever 138, the spring 144 returns the piston to its retracted or neutral position, and as the piston returns to its retracted position the pressure on the fluid in the cylinder 44 is received on the expansible plunger 106, and this results in compressing the plunger and thereby opening the port 86 in the head 82 and establishing communication between the reservoir and that portion of the cylinder 44 forward of the head 82; and simultaneously therewith the head 80 of the piston recedes, resulting in the creation of a partial vacuum in that portion of the cylinder 42 forward of the head 80, resulting in drawing fluid from the reservoir through the annular passage 76, the passages 88 in the head 80, past the cup 92, into that portion of the cylinder 42 forward of the head 80, completely filling the cylinder 42. When the piston is in fully retracted position, both of the cylinders 42 and 44 are completely filled with fluid under pressure equal to the load on the springs 132 and 134 of the respective expansible plungers 104 and 106.

Although this invention has been described in connection with certain specific embodiments, the principles involved are susceptible of numerous other applications that will readily occur to persons skilled in the art. The invention is, therefore, to be limited only by the scope of the appended claims.

Having thus described the various features of the invention, what I claim as new and desire to secure by Letters Patent is—

1. A fluid pressure producing device comprising a reservoir, opposed cylinders opening into the reservoir, a piston reciprocable in the cylinders including a hollow cylindrical slotted body having an orificed head on each end thereof, opposed expansible plungers movable in the cylindrical body for cooperation with the orificed heads, and a lever for actuating the plungers having a part extended through the slot and interposed between the plungers.

2. A fluid pressure producing device comprising a reservoir, opposed cylinders opening into the reservoir, heads on the outer ends of cylinders having discharge ports, a piston reciprocable in the cylinders including a hollow cylindrical slotted body having an orificed head on each end thereof, opposed expansible plungers movable in the body for cooperation with the orificed heads, an actuator having a part extended through the slot and interposed between the plungers, and means for simultaneously returning the piston and actuator to neutral position.

3. A fluid pressure producing device comprising a reservoir, opposed cylinders opening into the reservoir, a piston reciprocable in the cylinders including a hollow cylindrical body having a slot therein, an orificed head on each end of the piston, opposed expansible plungers reciprocable in the cylinders for cooperation with the orificed heads, a shaft in the reservoir, an actuator rockable on the shaft having a part engaging the plungers, and a spring on the shaft having its respective ends projecting into the slot in the body of the piston.

4. A fluid pressure producing device comprising a reservoir, opposed cylinders opening into the reservoir, a piston reciprocable in the cylinders including a hollow cylindrical body of smaller diameter than that of the cylinders having a centralized slot, an orificed head on each end of the piston having spaced passages therethrough, opposed expansible plungers reciprocable in the piston for cooperation with the orifices in the heads, a shaft mounted transversely of the reservoir, an actuator on the shaft having a part engaging the plunger, and a spring wound on the shaft having its respective ends extended into the slot in the piston.

5. A fluid pressure producing device comprising a reservoir, opposed cylinders opening into the reservoir, a head on each of the cylinders having a discharge port, valves controlling the discharge ports, a piston reciprocable in the cylinders including a cylindrical body of smaller diameter than that of the cylinders having a centralized slot, an orificed head on each end of the piston having spaced peripheral passages therethrough, sealing cups on the heads of the piston controlling the passages and overhanging the orifices, opposed expansible plungers reciprocable in the piston for cooperation with the orifices in the heads, a shaft mounted transversely of the reservoir, an actuator rockable on the shaft having a part interposed between and engaging the plungers, and a spring wound on the shaft having its respective ends normally engaging the wall of the reservoir and projecting therefrom into the slot in the piston.

6. In a fluid pressure system, a fluid pressure producing device comprising a reservoir, opposed cylinders opening into the reservoir, a head on each cylinder having a discharge port, valves controlling the discharge ports, a fluid pressure actuated motor connected to each of the discharge ports, a rockable member connected to the motors, a piston reciprocable in the cylinders including a cylindrical body of smaller diameter than that of the cylinders having a centralized slot, a head on each end of the piston having an axial orifice and peripheral passages therethrough, a sealing cup on each of the heads controlling the passages through the heads and overhanging the orifices in the heads, opposed expansible plungers reciprocable in the pistons for cooperation with the orifice in the heads of the piston, a shaft mounted transversely of the reservoir, an actuator rockable on the shaft having a part interposed between and engaging the plungers, a spring wound on the shaft having its respective ends normally engaging the wall of the reservoir and extending therefrom into the slot in the piston.

HERBERT C. BOWEN.